United States Patent
Naito

(10) Patent No.: US 10,283,789 B2
(45) Date of Patent: May 7, 2019

(54) FUEL CELL STACK

(71) Applicant: HONDA MOTOR CO., LTD., Tokyo (JP)

(72) Inventor: Hideharu Naito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 247 days.

(21) Appl. No.: 15/360,998

(22) Filed: Nov. 24, 2016

(65) Prior Publication Data
US 2017/0149075 A1    May 25, 2017

(30) Foreign Application Priority Data
Nov. 24, 2015   (JP) ................. 2015-228653

(51) Int. Cl.
| | |
|---|---|
| *H01M 8/1018* | (2016.01) |
| *H01M 8/2457* | (2016.01) |
| *H01M 8/2475* | (2016.01) |
| *H01M 8/2484* | (2016.01) |
| *H01M 8/04119* | (2016.01) |
| *B60L 50/71* | (2019.01) |
| *B60L 50/72* | (2019.01) |
| *B60L 58/33* | (2019.01) |

(52) U.S. Cl.
CPC ......... *H01M 8/04156* (2013.01); *B60L 50/71* (2019.02); *B60L 50/72* (2019.02); *B60L 58/33* (2019.02); *H01M 8/2457* (2016.02); *H01M 8/2475* (2013.01); *H01M 8/2484* (2016.02); *H01M 2008/1095* (2013.01); *H01M 2250/20* (2013.01); *Y02T 90/32* (2013.01); *Y02T 90/34* (2013.01)

(58) Field of Classification Search
CPC ........... H01M 8/04156; H01M 8/2457; H01M 8/2475; H01M 8/2484; H01M 2250/20; B60L 11/1896; B60L 11/1883; B60L 11/1892; B60L 11/1898; Y02T 90/32
See application file for complete search history.

(56) References Cited

U.S. PATENT DOCUMENTS

2006/0024544 A1*   2/2006   Nielsen ............ H01M 8/04007
                                                            429/410

FOREIGN PATENT DOCUMENTS

JP         2004-040950        2/2004

* cited by examiner

*Primary Examiner* — Eugenia Wang
(74) *Attorney, Agent, or Firm* — Mori & Ward, LLP

(57) ABSTRACT

A fuel cell stack includes a stack body, a stack casing, and an exhaust duct. The stack body includes a first end, a second end, a bottom, a top, a side, and a downwardly inclined portion. The top has a substantially flat portion with an end point. The side extends between the top and the bottom and between the first end and the second end. The downwardly inclined portion connects the end point of the substantially flat portion and the side. The stack casing accommodates the stack body. The stack casing includes an upper wall and a side wall. The side wall is opposite to the side of the stack body. The exhaust duct is connected to the upper wall of the stack casing. The exhaust duct has an opening on the upper wall. The opening is arranged between the end point and the side wall.

7 Claims, 6 Drawing Sheets

FUEL CELL STACK

CROSS-REFERENCE TO RELATED APPLICATIONS

The present application claims priority under 35 U.S.C. § 119 to Japanese Patent Application No. 2015-228653, filed Nov. 24, 2015. The contents of this application are incorporated herein by reference in their entirety.

BACKGROUND OF THE INVENTION

Field of the Invention

The present invention relates to a fuel cell stack.

Discussion of the Background

For example, a solid polymer type fuel cell has an electrolyte membrane and electrode structure (MEA) in which an anode electrode is arranged on one surface of the electrolyte membrane consisting of a polymer ion exchange membrane and a cathode electrode is arranged on the other surface thereof, respectively. In the electrolyte membrane and electrode structure, a power generating cell (unit cell) is constituted by being sandwiched between separators. Generally, the predetermined number of the power generating cells is stacked thereby to be loaded on a fuel cell powered vehicle for example as an onboard fuel cell stack.

In the fuel cell powered vehicle, there is a possibility that especially hydrogen of fuel gas leaks out in a space in which the fuel cell stack is loaded. Therefore, the fuel cell powered vehicle as disclosed in Japanese Patent Application Publication No. 2004-040950 is proposed on purpose to efficiently exhaust outwardly the hydrogen which leaks out of the fuel cell stack.

In this fuel cell powered vehicle, a closed space for loading the fuel cell thereon is arranged in front of a cabin. Then, as occasion demands, a first opening portion is provided in an upper part of the closed space and a second opening portion is provided in a position in which a negative pressure is generated at the time of travelling whereby to discharge the hydrogen leaking out from a fuel cell system into the closed space.

Accordingly, in the case where the opening portion is provided in the upper part of the closed space, the hydrogen leaking out from the fuel cell system within the closed space may be surely ventilated outside the vehicle especially in a stopping state of the vehicle. Moreover, in the case where the opening portion is provided in the negative pressure generating position, the hydrogen leaking out from the fuel cell system during travelling may be discharged from the closed space.

SUMMARY OF THE INVENTION

According to one aspect of the present invention, a fuel cell stack includes a stack body, a stack casing, and an exhaust duct. The stack body includes a plurality of power generating cells configured to generate electric power by electrochemical reaction of fuel gas and oxidant gas are stacked in the horizontal direction, with electric power generating surfaces thereof disposed in a standing posture. The stack casing houses the stack body therein. The exhaust duct is provided in an upper part of the stack casing and has an opening portion which opens into the stack casing. The stack body is provided, at an upper corner portion thereof, with a downwardly inclined portion which is inclined downwardly when viewed from the stacked direction, and an inclination starting position of the downwardly inclined portion is configured to be located on an inside in the horizontal direction of the stack casing in relation to the opening portion of the exhaust duct which is disposed above the downwardly inclined portion.

According to another aspect of the present invention, a fuel cell stack includes a stack body, a stack casing, and an exhaust duct. The stack body includes power generating cells which are stacked in a lateral direction to constitute the stack body and which are configured to generate electric power via electrochemical reaction between fuel gas and oxidant gas. The stack body includes a first end, a second end, a bottom, a top, a side, and a downwardly inclined portion. The second end is opposite to the first end in the lateral direction. The top is opposite to the bottom in an up-down direction perpendicular to the lateral direction. The top has a substantially flat portion with an end point at one end of the flat portion viewed in the lateral direction. The side extends between the top and the bottom and between the first end and the second end. The downwardly inclined portion connects the end point of the substantially flat portion and the side to be inclined from the end point toward the side downwardly viewed in the lateral direction. The stack casing accommodates the stack body therein. The stack casing includes an upper wall and a side wall. The upper wall is opposite to the top in the up-down direction. The side wall is opposite to the side of the stack body in a width direction perpendicular to the lateral direction and the up-down direction. The exhaust duct is connected to the upper wall of the stack casing. The exhaust duct has an opening on the upper wall. The opening is arranged between the end point and the side wall viewed in the lateral direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
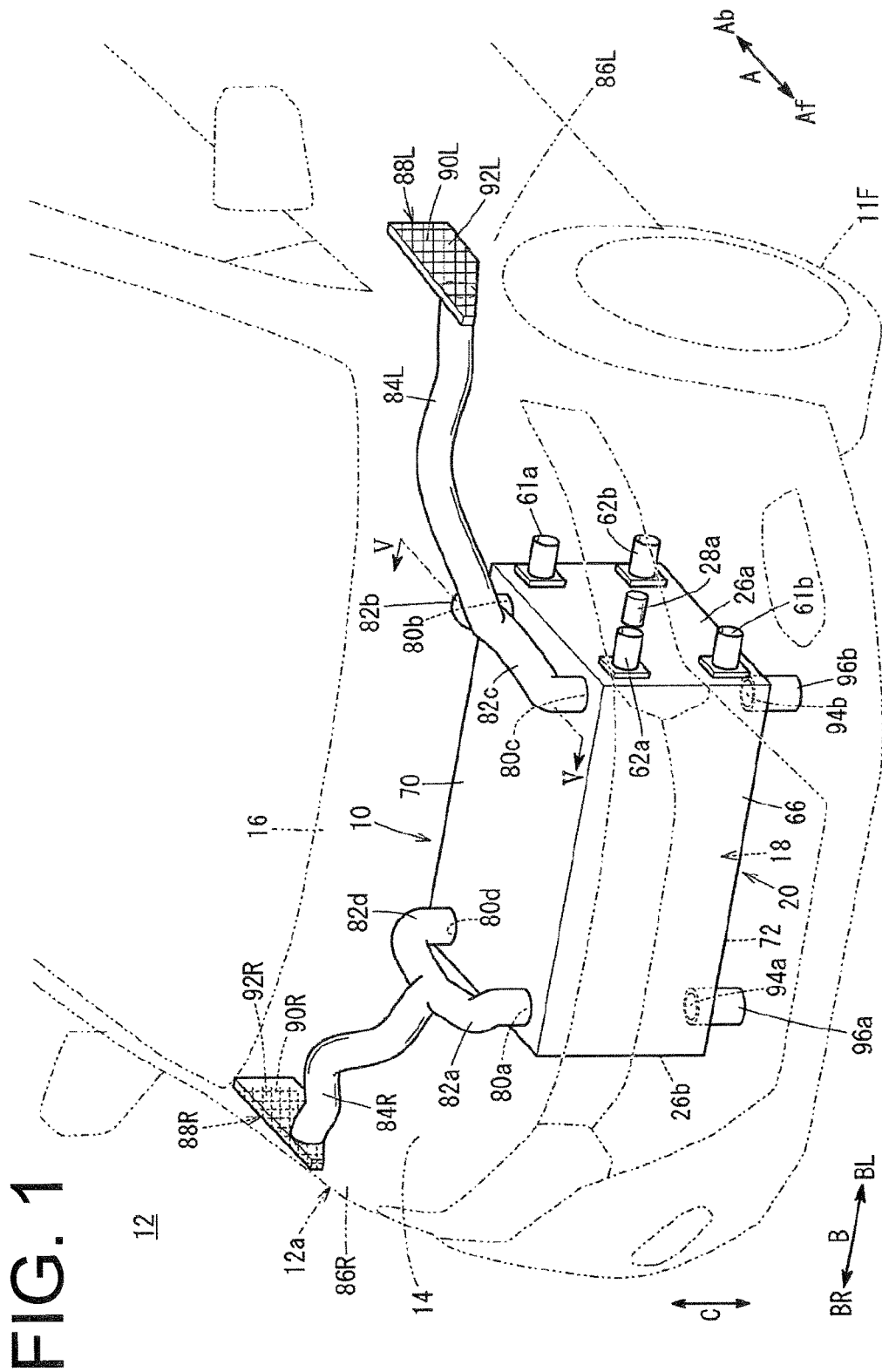
FIG. 1 is a schematic perspective view of a front part of a fuel cell powered vehicle on which a fuel cell stack in accordance with an embodiment of the present invention is loaded.

The embodiments will now be described with reference to the accompanying drawings, wherein like reference numerals designate corresponding or identical elements throughout the various drawings.

Figure 2:
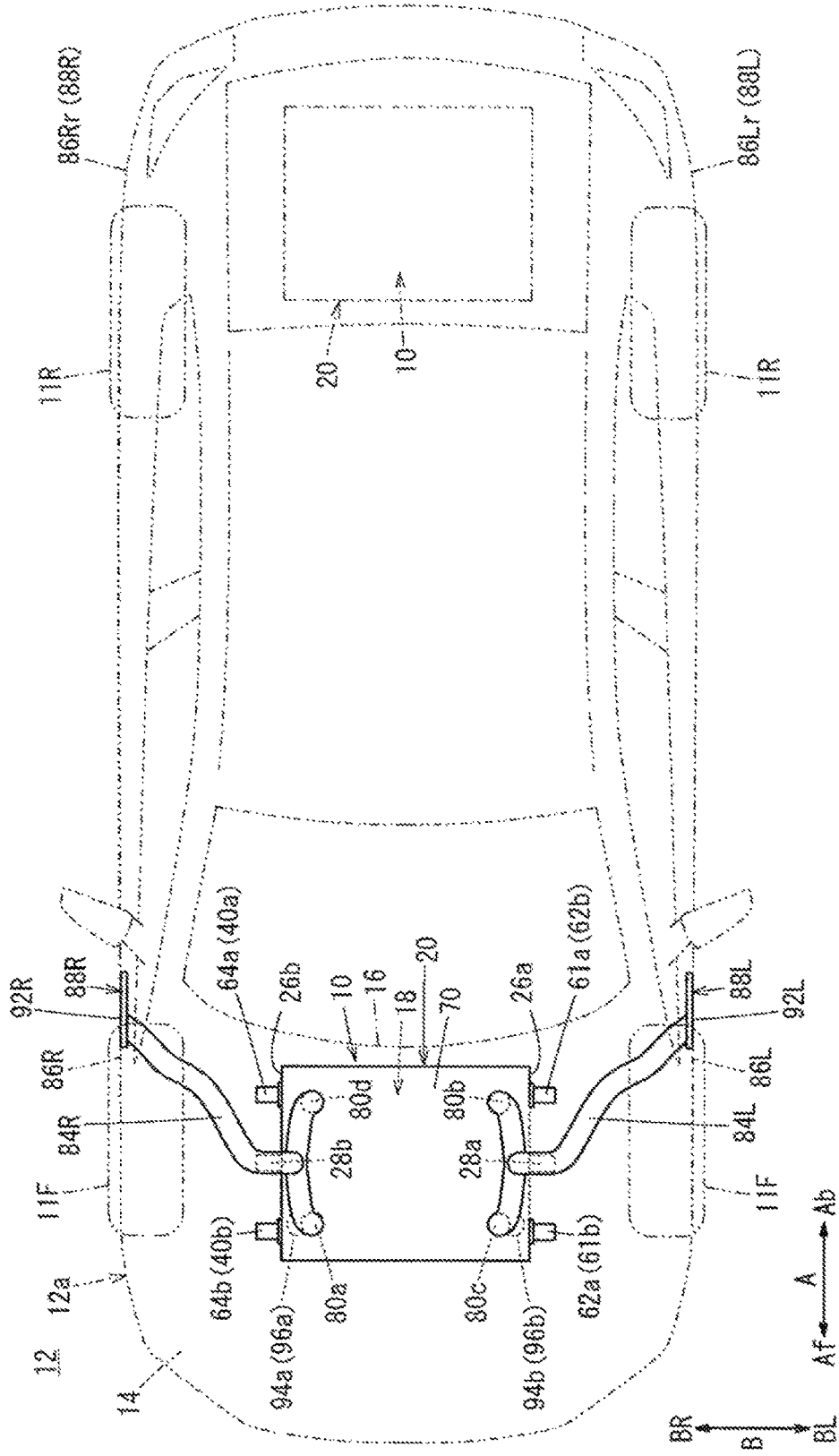
FIG. 2 is a schematic plan view of the fuel cell powered vehicle.

As shown in FIGS. 1 and 2, a fuel cell stack 10 according to a first embodiment of the present invention is loaded on a fuel cell powered vehicle 12 such as a fuel cell powered electric vehicle or the like, for example. The fuel cell powered vehicle 12 has a vehicle main body 12a provided with front wheels 11F and rear wheels 11R (see FIG. 2). On the side of the front wheels 11F of the vehicle main body 12a, a front box (motor room) 14 on which the fuel cell stack 10 is loaded is formed in front of a dash board 16.

Figure 3:
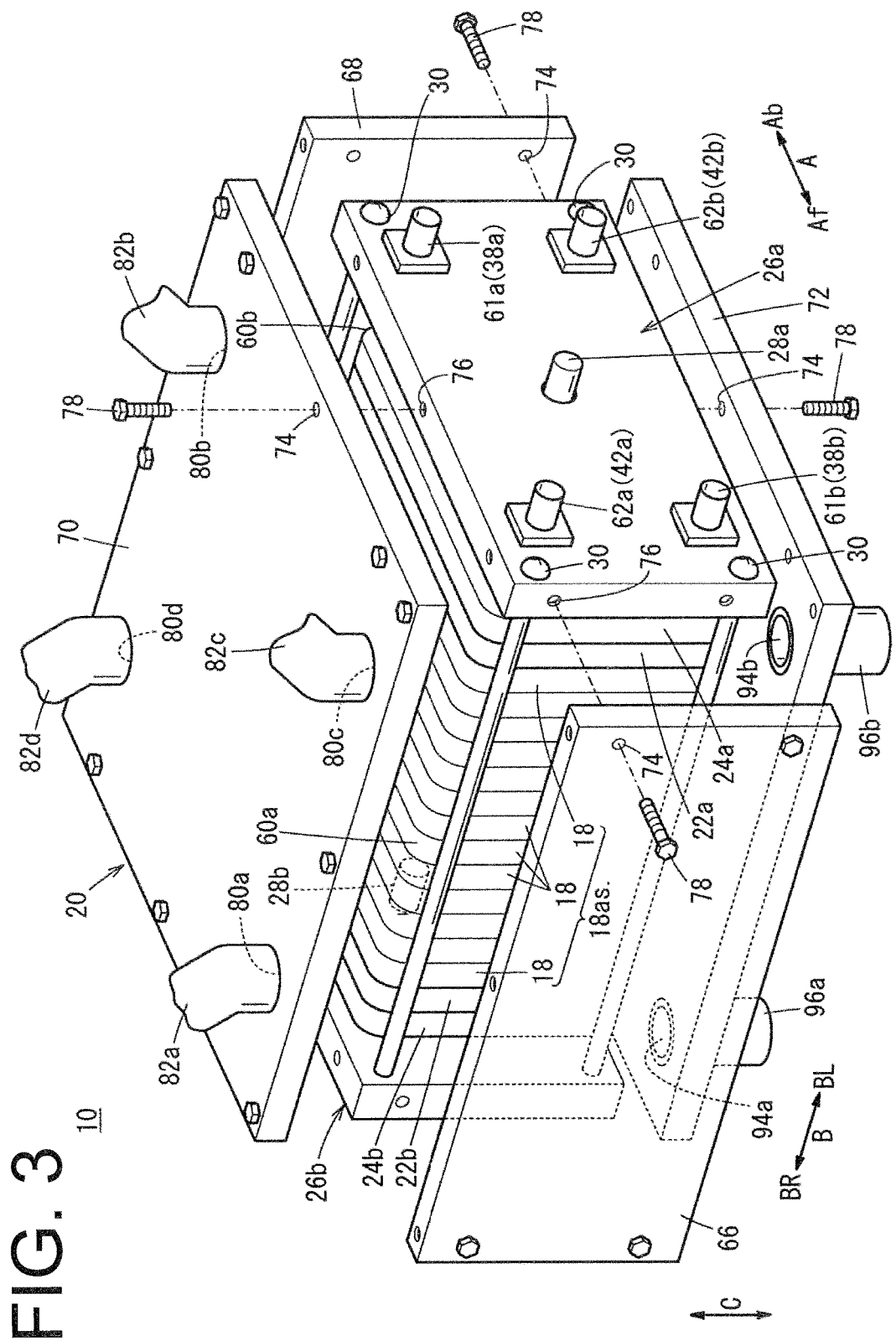
FIG. 3 is an exploded perspective view of the fuel cell stack.

As shown in FIG. 3, the fuel cell stack 10 is provided with a stack body 18as. in which a plurality of power generating cells 18 are stacked, and the stack body 18as. is housed in a stack casing 20. The plurality of power generating cells 18 are stacked in the vehicle width direction (in the direction of an arrow B) corresponding to the horizontal direction, with electric power generating surfaces thereof disposed in a standing posture. On one end in the stacked direction of the plurality of the power generating cells 18, a first terminal plate 22a, a first insulating plate 24a, and a first end plate 26a are arranged in the order named toward outside.

On the other end in the stacked direction of the plurality of the power generating cells 18, a second terminal plate 22b, a second insulating plate 24b, and a second end plate 26b are arranged in the order named toward outside. The first end plate 26a and the second end plate 26b are arranged on both ends in the vehicle width direction of the fuel cell stack 10.

The first end plate 26a and the second end plate 26b is configured to be larger in outside dimension than the power generating cells 18, the first insulating plate 24a and the second insulating plate 24b. The first terminal plate 22a may be accommodated in a recess of an interior of the first insulating plate 24a, while the second terminal plate 22b may be accommodated in a recess of an interior of the second insulating plate 24b.

A first power output terminal 28a which is connected to the first terminal plate 22a extends outwardly from a center part (or a position eccentric from the center part) of the first end plate 26a of horizontally long shape. A second power output terminal 28b which is connected to the second terminal plate 22b extends outwardly from a center part (or a position eccentric from the center part) of the second end plate 26b of horizontally long shape.

Each of corner portions of the first end plate 26a and the second end plate 26b is fixed by tie rods 30 which extend in the stacked direction, and given fastening load thereto in the stacked direction. Herein, rectangular connecting bars which connect together the center parts of each side of first end plate 26a and the second end plate 26b may be employed instead of the tie rods 30.

Figure 4:
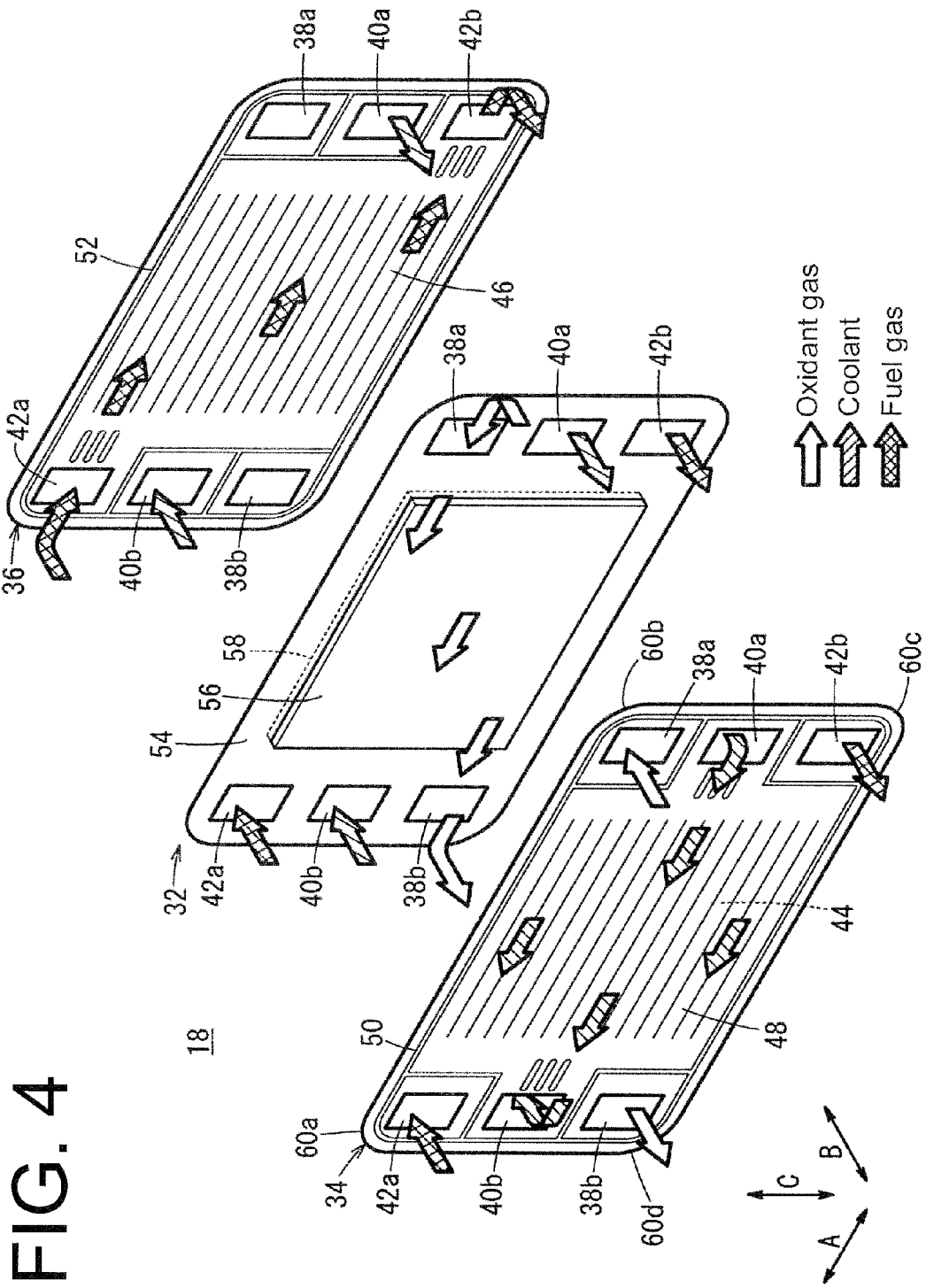
FIG. 4 is an exploded perspective view of an essential part of a power generating cell constituting the fuel cell stack.

As shown in FIG. 4, in the power generating cell 18, an electrolyte membrane and electrode structure 32 is held between a first separator 34 and a second separator 36. The first separator 34 and the second separator 36 are formed of a metallic separator or a carbon separator.

On one end edge part, in the direction of an arrow A, of the power generating cell 18, there are provided an oxidant gas inlet communicating port 38a, a coolant inlet communicating port 40a and a fuel gas outlet communicating port 42b which are communicated separately in the stacked direction (in the direction of an arrow B) and arranged in the direction of an arrow C (the vertical direction) in order. The oxidant gas inlet communicating port 38a supplies an oxidant gas such as an oxygen containing gas. The coolant inlet communicating port 40a supplies a coolant, and the fuel gas outlet communicating port 42b discharges a fuel gas such as a hydrogen containing gas.

On the other end edge part, in the direction of the arrow A, of the power generating cell 18, there are provided a fuel gas inlet communicating port 42a, a coolant outlet communicating port 40b and an oxidant gas outlet communicating port 38b which are communicated separately in the direction of the arrow B and arranged in the direction of the arrow C in order. The fuel gas inlet communicating port 42a supplies the fuel gas. The coolant outlet communicating port 40b discharges the coolant, and the oxidant gas outlet communicating port 38b discharges the oxidant gas.

On a surface of the first separator 34 facing toward the electrolyte membrane and electrode structure 32 there is provided an oxidant gas flow passage 44 which communicates with the oxidant gas inlet communicating port 38a and the oxidant gas outlet communicating port 38b. On a surface of the second separator 36 facing toward the electrolyte membrane and electrode structure 32, there is provided a fuel gas flow passage 46 which communicates with the fuel gas inlet communicating port 42a and the fuel gas outlet communicating port 42b.

A coolant flow passage 48 which provides communication between the coolant inlet communicating port 40a and the coolant outlet communicating port 40b is provided between the first separator 34 and the second separator 36 which are located close to each other so as to constitute the power generating cell 18. Sealing members 50, 52 are provided integrally or separately on the first separator 34 and the second separator 36, respectively.

The electrolyte membrane and electrode structure 32 includes a solid polymer electrolyte membrane (cation exchange membrane) 54 which is, for example, a perfluorosulfonic acid membrane containing water, a cathode electrode 56 and an anode electrode 58 which sandwich the solid polymer electrolyte membrane 54 therebetween. The cathode electrode 56 and the anode electrode 58 have a gas diffusion layer formed of a carbon paper or the like and an electrode catalyst layer which is formed by evenly applying porous carbon particles carrying a platinum alloy on a surface thereof, to a surface of the gas diffusion layer. The electrode catalyst layer is formed on each surface of the solid polymer electrolyte membrane 54.

On four corners of each of the power generating cells 18, there are formed curved portions 60a, 60b, 60c and 60d each of which has a round curved surface. The curved portion 60a is formed on the corner portion in the vicinity of the fuel gas inlet communicating port 42a, and the curved portion 60b is formed on the corner portion in the vicinity of the oxidant gas inlet communicating port 38a. The curved portion 60c is formed on the corner in the vicinity of the fuel gas outlet communicating port 42b and the curved portion 60d is formed on the corner portion in the vicinity of the oxidant gas outlet communicating port 38b.

As shown in FIG. 3, in one of diagonally opposite positions of the first end plate 26a, there are provided an oxidant gas supply manifold 61a communicating with the oxidant gas inlet communicating port 38a and an oxidant gas exhaust manifold 61b communicating with the oxidant gas outlet communicating port 38b. In the other of diagonally opposite positions of the first end plate 26a, there are provided a fuel gas supply manifold 62a communicating with the fuel gas inlet communicating port 42a and a fuel gas exhaust manifold 62b communicating with the fuel gas outlet communicating port 42b.

As shown in FIG. 2, in the second end plate 26b, there are provided a coolant supply manifold 64a communicating with the coolant inlet communicating port 40a and a coolant exhaust manifold 64b communicating with the coolant outlet communicating port 40b.

As shown in FIG. 3, the fuel cell stack 10 is provided with the stack casing 20 of a square shape in a plan view, for example, a rectangular shape in a plan view for accommodating the stack body 18as. The stack casing 20 includes a front side panel 66, a rear side panel 68, an upper panel 70, a lower panel 72, the first end plate 26*a* and the second end plate 26*b*. Each of component parts constituting the stack casing 20 is fixedly secured relative to the first end plate 26*a* and the second end plate 26*b* by screws 78 which are screw-threaded into tapped holes 76 through hole portions 74.

Opening portions 80*a*, 80*b* which provide communication between the interior of the stack casing 20 and the exterior thereof are formed in one of diagonally opposite positions of the upper panel 70, and opening portions 80*c*, 80*d* which provide communication between the interior of the stack casing 20 and the exterior thereof are formed in the other of diagonally opposite positions. The opening portions 80*a*, 80*c* are provided at each lateral part on the front side (in the direction of an arrow Af) of the stack casing 20 and arranged on the upper side in the vertical direction of the fuel gas inlet communicating port 42*a*. Although the opening portions 80*b*, 80*d* are located in each lateral part on the rear side (in the direction of an arrow Ab) of the stack casing 20, they may be located in the first end plate 26*a* and the second end plate 26*b*.

One end of each of exhaust ducts 82*a*~82*d* is connected to each of the opening portions 80*a*~80*d*. As shown in FIGS. 1 and 2, the other end of the exhaust duct 82*a* and the other end of the exhaust duct 82*d* are joined together and connected to one end of a right exhaust duct 84R. The other end of the exhaust duct 82*b* and the other end of the exhaust duct 82*c* are joined together and connected to one end of a left exhaust duct 84L.

As shown in FIG. 2, the right exhaust duct 84R and the left exhaust duct 84L are arranged so as to be inclined outwardly in the vehicle width direction (in the directions of arrows BR and BL) toward the rear side (in the direction of the arrow Ab) in the forward and rearward direction of the vehicle in a plan view of the vehicle. The right exhaust duct 84R is configured to open at a right fender part 86R of the vehicle main body 12*a* constituting the fuel cell powered vehicle 12, and the left exhaust duct 84L is configured to open at a left fender part 86L of the vehicle main body 12*a*. Elastic hoses may be connected to intermediate portions of the right exhaust duct 84R and the left exhaust duct 84L. In addition, the right exhaust duct 84R and the left exhaust duct 84L may be formed in a horizontally flat shape.

As shown in FIGS. 1 and 2, a left exhaust member 88L and a right exhaust member 88R are provided in the left fender part 86L and the right fender part 86R and located above and at the rear of the front wheels 11F, respectively. Each of the left exhaust member 88L and the right exhaust member 88R has a space in an interior thereof, and a mesh member 90L and a mesh member 90R are provided on surfaces of the exhaust members. A left exhaust port 92L and a right exhaust port 92R are formed by the mesh members 90L, 90R. Herein, the left exhaust member 88L and the right exhaust member 88R may be formed by a plate provided with a plurality of interstices, which circulates the external air through the mesh member 90L and the mesh member 90R.

With respect to the lower panel 72, inlet ports 94*a*, 94*b* are formed on the front side in the forward and rearward direction (the direction of the arrow Af) of the vehicle. One end of each of inlet ducts 96*a*, 96*b* is connected to each of the inlet ports 94*a*, 94*b*, and the other end of each of the inlet ducts 96*a*, 96*b* extends vertically downward.

Figure 5:
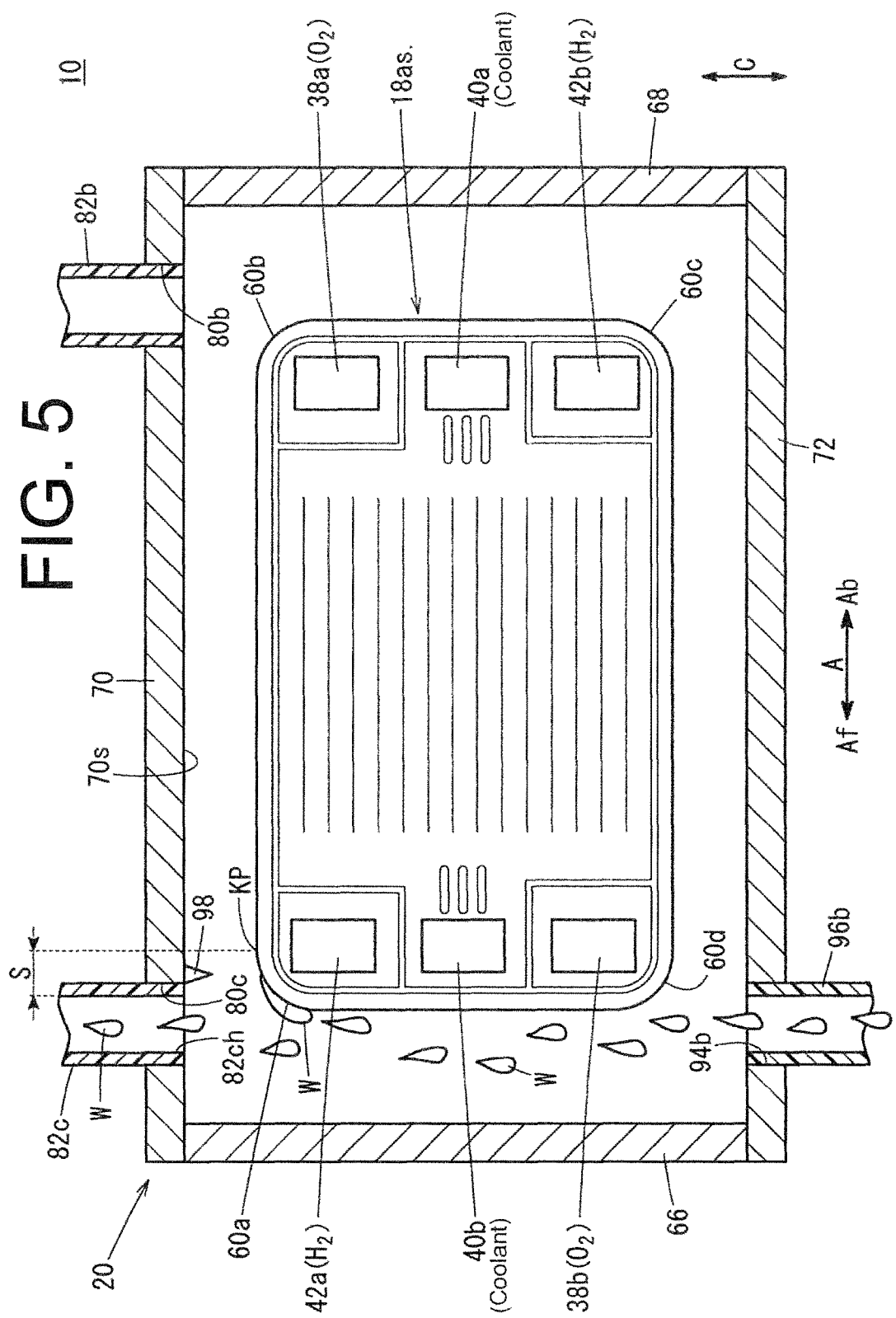
FIG. 5 is a cross sectional view of the fuel cell stack taken on line V-V of FIG. 1.

As shown in FIG. 5, the curved portion 60*a* constituting a downwardly inclined portion which is inclined downwardly when viewed in the stacked direction (the direction of the arrow B) is provided in the upper corner portion of the stack body 18*as*. The exhaust duct 82*c* disposed above the curved portion 60*a* has an opening portion 82*ch* which opens into the stack casing 20.

Further, the exhaust ducts 82*a*, 82*c* are disposed above the curved portion 60*a*. Hereinafter, the explanation will be made in detail with respect to the exhaust duct 82*c* only, and the explanation of the exhaust duct 82*a* will be omitted. Moreover, the exhaust ducts 82*b*, 82*d* are disposed above the curved portion 60*b*. Since the exhaust ducts 82*b*, 82*d* are constituted in the same manner as the exhaust duct 82*c* to be explained hereunder, the explanation thereof will be omitted.

An inclination start position KP of the curved portion 60*a* is configured to be located on the inside in the horizontal direction of the stack casing 20 in relation to the opening portion 82*ch* of the exhaust duct 82*c* which is disposed above the curved portion 60*a*. To be concrete, an inner wall surface on the inside (on the side of the stack body 18*as*.) on which the opening portion 82*ch* of the exhaust duct 82*c* is formed is offset outwardly (on the side of the front side panel 66) by a distance S from the inclination start position KP. By the way, the downwardly inclined portion which is inclined downwardly may be formed for example by a chamfered portion (arched surface) or a polygonal portion, other than the curved portion 60*a*.

A projecting portion 98 is provide in an inner surface 70*s* of the upper panel 70 (an upper surface part of the stack casing 20) so as to be located between a vertically downward position of the opening portion 82*ch* and the inclination start position KP of the curved portion 60*a*. The projecting portion 98 has a downwardly tapered shape and may be configured in a conical shape or triangular pyramid shape. In addition, the projecting portion 98 may be formed in the shape of a triangular prism shape, etc. having a predetermined length in the stacked direction.

The fuel cell stack 10 is fixedly secured to a vehicle frame through mounting members (not shown) provided in the first end plate 26*a* and the second end plate 26*b*.

The operation of the fuel cell stack 10 configured as above will be explained hereunder in relation to the fuel cell powered vehicle 12.

First, when driving the fuel cell powered vehicle 12, as shown in FIG. 3, the fuel gas is supplied from the fuel gas supply manifold 62*a* of the first end plate 26*a* to the fuel gas inlet communicating port 42*a*. On the other hand, the oxidant gas is supplied from the oxidant gas supply manifold 61*a* of the first end plate 26*a* to the oxidant gas inlet communicating port 38*a*.

As shown in FIG. 4, the fuel gas is introduced from the fuel gas inlet communicating port 42*a* to the fuel gas flow passage 46 of the second separator 36. This hydrogen gas circulates in the direction of the arrow A thereby to be supplied to the anode electrode 58 constituting the electrolyte membrane and electrode structure 32.

The oxidant gas is introduced from the oxidant gas inlet communicating port 38*a* to the oxidant gas flow passage 44 of the first separator 34. The oxidant gas circulates in the direction of the arrow A (in the opposite direction to that of the fuel gas) thereby to be supplied to the cathode electrode 56 constituting the electrolyte membrane and electrode structure 32.

Accordingly, in the electrolyte membrane and electrode structure 32, the hydrogen gas supplied to the anode electrode 58 and air supplied to the cathode electrode 56 are consumed within the electrode catalyst layer by the electrochemical reaction, so that electricity is generated.

The fuel gas, as shown in FIG. 3, is discharged from the fuel gas outlet communicating port 42b to the fuel gas exhaust manifold 62b of the first end plate 26a. The oxidant gas is discharged from the oxidant gas outlet communicating port 38b to the oxidant gas exhaust manifold 61b of the first end plate 26a.

Further, the coolant, as shown in FIG. 2, is supplied from the coolant supply manifold 64a of the second end plate 26b to the coolant inlet communicating port 40a. As shown in FIG. 4, the coolant is introduced into the coolant flow passage 48 between the first separator 34 and the second separator 36. The coolant, after having cooled the electrolyte membrane and electrode structure 32, flows through the coolant outlet communicating port 40b and is discharged into the coolant exhaust manifold 64b.

In this case, in the first embodiment, as shown in FIG. 1, the opening portions 80a~80d are formed in the upper panel 70 constituting the upper surface part of the stack casing 20. One end of each of the exhaust ducts 82a~82d is connected to each of the opening portions 80a~80d. Then, the other ends of the exhaust ducts 82a and 82d are connected to one end of the right exhaust duct 84R, and the other ends of the exhaust ducts 82b and 82c are connected to one end of the left exhaust duct 84L.

Further, the right exhaust duct 84R opens at the right fender portion 86R of the vehicle main body 12a constituting the fuel cell powered vehicle, while the left exhaust duct 84L opens at the left fender portion 86L of the vehicle main body 12a.

Therefore, since the fuel gas such as hydrogen which leaks out from the fuel cell stack 10 is lighter than air, it rises up within the stack casing 20 and is discharged from each of the opening portions 80a~80d to the outside. Accordingly, the fuel gas does not stay in the stack casing 20. Thus, with the simple configuration, the fuel gas leaked within the stack casing 20 can be discharged easily and surely to the outside of the vehicle.

Further, as shown in FIG. 5, the inclination start position KP of the curved portion 60a provided on the stack body 18as. is configured to be located on the inside in the horizontal direction of the stack casing 20 in relation to the opening portion 82ch of the exhaust duct 82c disposed above the curved portion 60a. To be concrete, the inner wall surface on the inside (on the side of the stack body 18as.), in which the opening portion 82ch of the exhaust duct 82c is formed, is offset outwardly (on the side of the front side panel 66) by the distance S from the inclination start position KP.

For example, in the case where the fuel cell powered vehicle 12 is stopped its operation and cooled, water vapor is condensed within the exhaust duct 82c whereby water (a drop of water) W is easy to be formed. This water W falls down from the opening portion 82ch into the stack casing 20.

At that time, in the first embodiment, the falling water W comes into contact with the curved portion (the downwardly inclined portion) 60a of the stack body 18as. and is smoothly discharged outwardly of the stack body 18as. along a form of the curved portion 60a. In addition, the water W passes through the inlet ducts 96a, 96b thereby to be discharged outwardly of the fuel cell powered vehicle 12. Therefore, the effect that the water W is not collected on the stack body 18as. whereby to easily improve the drainability can be obtained.

Further, the projecting portion 98 is provided in the inner surface 70s of the upper panel 70 so as to be located between the vertically downward position of the opening portion 82ch and the inclination start position KP of the curved portion 60a. Accordingly, for example, when the fuel cell powered vehicle 12 is stopped on the sloping ground, the water W is arrested by the projecting portion 98 so as to be able to fall down onto the curved portion 60a even if the water flows toward the stack body 18as. from the opening portion 82ch. Therefore, the water W is prevented from staying on the stack body 18as. as much as possible.

By the way, as shown in FIG. 2, there may be cases where the stack casing 20 in which the fuel cell stack 10 is accommodated is arranged in the rear of the vehicle main body 12a. In such case, the left exhaust member 88L and the right exhaust member 88R may be arranged in a left fender portion 86Lr and a right fender portion 86Rr for the rear wheels 11R.

Further, the opening portions 80a~80d are provided in the stack casing 20, and the exhaust ducts 82a~82d are connected to the opening portions 80a~80d, but not limited to this configuration. For example, only the opening portions 80a, 80b may be provided, and the exhaust ducts 82a, 82b may be connected to the opening portions 80a, 80b.

Further, the first end plate 26a and the second end plate 26b are used as the component parts of the stack casing 20, but not limited to this. The fuel cell stack 10 may be housed in a separate casing of rectangular parallelepiped.

Figure 6:
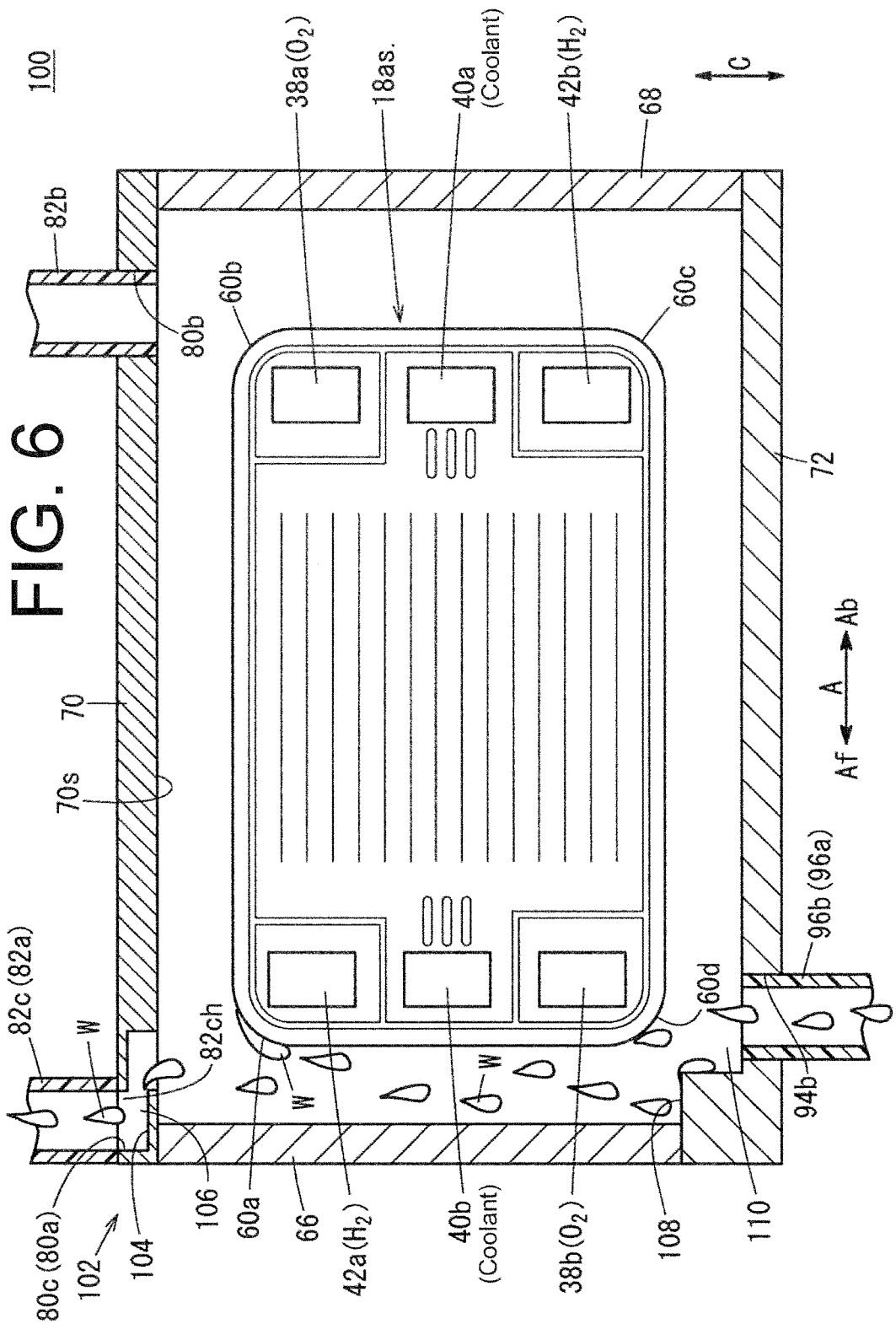
FIG. 6 is a cross sectional view of the fuel cell stack in accordance with a second embodiment of the present invention.

FIG. 6 is a cross sectional view of a fuel cell stack 100 according to a second embodiment. Herein, component elements identical to those of the fuel cell stack 10 of the first embodiment are given like reference characters, and the detailed explanation is omitted.

The fuel cell stack 100 has a stack body 18as. in which a plurality of power generating cells 18 are stacked, and the stack body 18as. is housed in a stack casing 102. Opening portions 80a, 80c are formed in an upper panel 70 constituting the stack casing 102 and located above a front side panel 66. Exhaust ducts 82a, 82c are connected to the opening portions 80a, 80c.

With respect to the upper panel 70, a horizontally projecting wall portion 104 is formed in the vertically downward direction of the opening portion 80a, 80c. By having the wall portion 104 arranged below the opening portion 80a, 80c, in the stack casing 102, a crank 106 is provided in the vertically downward direction of the opening portion 80a, 80c. The crank 106 is formed in a step shape which extends vertically downward within the exhaust duct 82a, 82c, then, which is bent to extend in the horizontal direction, and further, which extends in the vertically downward direction. Within the stack casing 102, a crank 110 is also formed on the side of an inlet duct 96a, 96b by a horizontally projecting wall portion 108.

In the second embodiment constituted like this, water W comes into contact with the wall portion 104 forming the crank 106, before falling down into the stack casing 102 from the opening portion 82ch. Therefore, the force of water can be attenuated at the time the water W is introduced into the stack casing 102, and it is possible to further surely prevent the water W from adhering to and staying on the stack body 18as.

Furthermore, the wall portion 108 in which the crank 110 is formed is also provided on the lower side of the stack casing 102. Therefore, it is possible to prevent the water W from being vigorously discharged into the inlet duct 96a, 96b.

A fuel cell stack according to the embodiment of the present invention comprises a stack body in which a plurality of power generating cells configured to generate electric power by electrochemical reaction of fuel gas and oxidant gas are stacked in the horizontal direction, with electric power generating surfaces thereof disposed in a standing posture. The stack body is housed in a stack casing, and an exhaust duct is provided in an upper part of the stack casing and has an opening portion which opens into the stack casing.

The stack body is provided, at an upper corner portion thereof, with a downwardly inclined portion which is inclined downwardly when viewed from the stacked direction. An inclination starting position of the downwardly inclined portion is set to be located on an inside in the horizontal direction of the stack casing in relation to the opening portion of the exhaust duct which is disposed above the downwardly inclined portion.

Further, in this fuel cell stack, it is preferable that a projecting portion is provided to extend downwardly, on an inner surface of the upper part of the stack casing and located between a vertically downward position of the opening portion and the inclination starting position of the downwardly inclined portion.

Further, in this fuel cell stack, it is preferable that a crank is formed in the stack casing in the vertically downward position of the opening portion.

According to the embodiment of the present invention, since the exhaust duct is connected to the upper part of the stack casing, the fuel gas leaking out in the stack casing can be surely discharged outwardly of the vehicle by a simple configuration.

Further, the inclination starting position of the downwardly inclined portion which is provided in the upper corner portion of the stack body is set to be located on an inside in the horizontal direction of the stack casing in relation to the opening portion of the exhaust duct which is disposed above the downwardly inclined portion. Accordingly, water condensed within the exhaust duct, when dropping down from the opening portion into the stack casing, comes into contact with the downwardly inclined portion of the stack body and is smoothly discharged outwardly of the stack body along the downwardly inclined portion. Therefore, the water is not collected on the stack body whereby to easily improve the drainability.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
a stack body in which a plurality of power generating cells configured to generate electric power by electrochemical reaction of fuel gas and oxidant gas are stacked in a horizontal direction, with electric power generating surfaces thereof disposed in a standing posture;
a stack casing for housing the stack body therein; and
an exhaust duct being provided in an upper part of the stack casing and having an opening portion which opens into the stack casing,
wherein the stack body is provided, at an upper corner portion thereof, with a downwardly inclined portion which is inclined downwardly when viewed from a stacked direction, and an inclination starting position of the downwardly inclined portion is configured to be located on an inside in the horizontal direction of the stack casing in relation to the opening portion of the exhaust duct which is disposed above the downwardly inclined portion.

2. The fuel cell stack according to claim 1, further comprising a projecting portion extending downward, wherein the projecting portion is provided on an inner surface of the upper part of the stack casing and located between a vertically downward position of the opening portion and the inclination starting position of the downwardly inclined portion.

3. The fuel cell stack according to claim 1, further comprising a crank being formed in the stack casing in a vertically downward position of the opening portion.

4. A fuel cell stack comprising:
a stack body comprising power generating cells which are stacked in a lateral direction to constitute the stack body and which are configured to generate electric power via electrochemical reaction between fuel gas and oxidant gas, the stack body comprising:
a first end and a second end opposite to the first end in the lateral direction;
a bottom;
a top opposite to the bottom in an up-down direction perpendicular to the lateral direction, the top having a flat portion with an end point at one end of the flat portion viewed in the lateral direction;
a side extending between the top and the bottom and between the first end and the second end; and
a downwardly inclined portion connecting the end point of the flat portion and the side to be inclined from the end point toward the side downwardly viewed in the lateral direction;
a stack casing accommodating the stack body therein and comprising:
an upper wall opposite to the top in the up-down direction; and
a side wall opposite to the side of the stack body in a width direction perpendicular to the lateral direction and the up-down direction; and
an exhaust duct connected to the upper wall of the stack casing and having an opening on the upper wall, the opening being arranged between the end point and the side wall viewed in the lateral direction.

5. The fuel cell stack according to claim 4, further comprising:
a projecting portion extending downward,
wherein the projecting portion is provided on an inner surface of the upper wall of the stack casing and located directly above the downwardly inclined portion.

6. The fuel cell stack according to claim 4, further comprising:
a crank formed in the stack casing in a vertically downward position of the opening.

7. The fuel cell stack according to claim 4, wherein the power generating cells has electric power generating surfaces which are disposed in a standing posture.

* * * * *